United States Patent [19]

Bjork

[11] Patent Number: 5,223,707
[45] Date of Patent: Jun. 29, 1993

[54] OPTICALLY POWERED REMOTE SENSOR APPARATUS WITH SYNCHRONIZING MEANS

[75] Inventor: Paul E. Bjork, Forest Lake, Minn.
[73] Assignee: Honeywell Inc., Minneapolis, Minn.
[21] Appl. No.: 891,264
[22] Filed: Jun. 1, 1992
[51] Int. Cl.[5] ............................ G01D 5/34; H01J 5/16
[52] U.S. Cl. ............................ 250/227.21; 250/231.1; 359/158
[58] Field of Search ............... 250/227.21, 551, 227.23, 250/231.1; 359/158, 171, 168, 188, 195, 143

[56] References Cited

U.S. PATENT DOCUMENTS

| | | |
|---|---|---|
| 4,346,478 | 8/1982 | Sichling. |
| 4,820,916 | 4/1989 | Patriquin. |
| 4,857,727 | 8/1989 | Lenz et al.. |
| 4,963,729 | 10/1990 | Spillman et al.. |
| 5,031,453 | 7/1991 | Kline. |
| 5,049,825 | 9/1991 | Kline. |
| 5,059,783 | 10/1991 | Stranjord et al.. |
| 5,077,527 | 12/1991 | Patriquin. |
| 5,099,144 | 3/1992 | Sai .................................... 250/227.21 |
| 5,119,679 | 6/1992 | Frisch ............................. 250/227.21 |

OTHER PUBLICATIONS

Glomb, Jr., "Fly-by-light schemes move into demonstration stage," *Laser Focus World* Jun. 1990, pp. 167-176.
Bjork et al., "Optically Powered Sensors", 1988 Tech. Digest Sers. vol. 2 pt. 2 OSA, Wash. D.C. 1988, pp. 336-339.
Bjork et al., "Optically Powered Sensors for EMI Immune Aviation Sensing Systems," SPIE Conf. Proc. 1173, Boston, Mass. 1989, 1173-17.
Optically-powered Transducer with Optical-fiber Data Link, Akira Ohte, Koji Akiyama, Isamu Ohno, SPIE vol. 478 (1984).
Optically Powered Sensors: A Systems Approach to Fiber Optic Sensors James Lenz, Paul Bjork SPIE vol. 961, (1988).
Optically Powered Sensors Technology, Honeywell, Jul. 1990.

*Primary Examiner*—David C. Nelms
*Assistant Examiner*—Michael Messinger
*Attorney, Agent, or Firm*—Gregory A. Bruns

[57] ABSTRACT

Optically powered sensing apparatus which has a photodiode for converting optical power to electrical energy and a switching voltage converter for optimizing power transfer from the photo diode. A controller intermittently provides a synchronizing pulse train and a synchronizing receiver detects periods when optical power drops to zero. A transducer with driving and readout electronics provides electrical parameter signals which are digitized and synchronously transmitted to the controller during the periods of no optical power from the controller. Voltage regulation, impedance matching, and temperature compensation of the photodiode optimize power transfer.

18 Claims, 6 Drawing Sheets

OPTICALLY POWERED REMOTE SENSOR APPARATUS WITH SYNCHRONIZING MEANS

BACKGROUND OF THE INVENTION

The present invention relates generally to sensors and more particularly to optically powered sensors. In this approach, the sensor apparatus at the remote sensor location receives sufficient power in the form of light so that a usable level of optically generated electrical power is available for data acquisition and transmission.

Many next generation systems require highly reliable precise control functions. Optical sensors can provide high sensitivity, electromagnetic interference immunity, light weight, high reliability, low cost and a single fiber for input and output of signals.

Although fiber optic sensors offer great potential, relatively few passive fiber optic sensor systems are offered in the market at this time. An important requirement in building a system of sensors is the incorporation of a single standardized interface which uses the same interface protocol to multiplex a variety of fiber optic sensors. A wide variety of reliable inexpensive electronic transducers can then be used as sensor elements.

Optical sensors, in order to be practical, must operate reliably at extremely low power levels. There is a need for improved power transfer efficiency from the photodiode used for the conversion of light to electrical energy.

Thus, a need exists for a fiber optic sensing system that utilizes a standardized protocol for communicating with a variety of fiber optic sensors which operate at micropower levels.

SUMMARY OF THE INVENTION

The present invention solves these and other needs by providing an optically powered sensor apparatus for use with a controller that provides optical power to a remote sensor and receives optical signals from the sensor location on a single optical fiber or on multiple optical fibers.

In the preferred form a photodiode converts optical power to electrical energy. A synchronizing receiver detects a loss of optical power from the controller and provides synchronizing signals when optical power is not being received. A transducer with support electronics senses desired parameters and converts the parameters into electrical parameter signals which are synchronized and used to trigger a transmitter which applies current pulses to a photodiode to provide parameter information to the controller.

In a second aspect of the present invention, data transfer is provided by intermittently modulating an optical power source to provide a synchronous pulse train. Individual sensors are logically coded to respond with data during a unique preset subset of the pulse train sequence.

In another aspect, of the present invention, photodiode voltage regulation is provided to cause photodiode operation to maximize power transfer from the photodiode.

In another aspect, the combination of a transducer driver matched to a differential variable transformer transducer for efficient impedance matching and a ratiometric transducer readout utilizing sampling for micropower operation is provided.

DESCRIPTION OF THE PREFERRED EMBODIMENT

Figure 1:
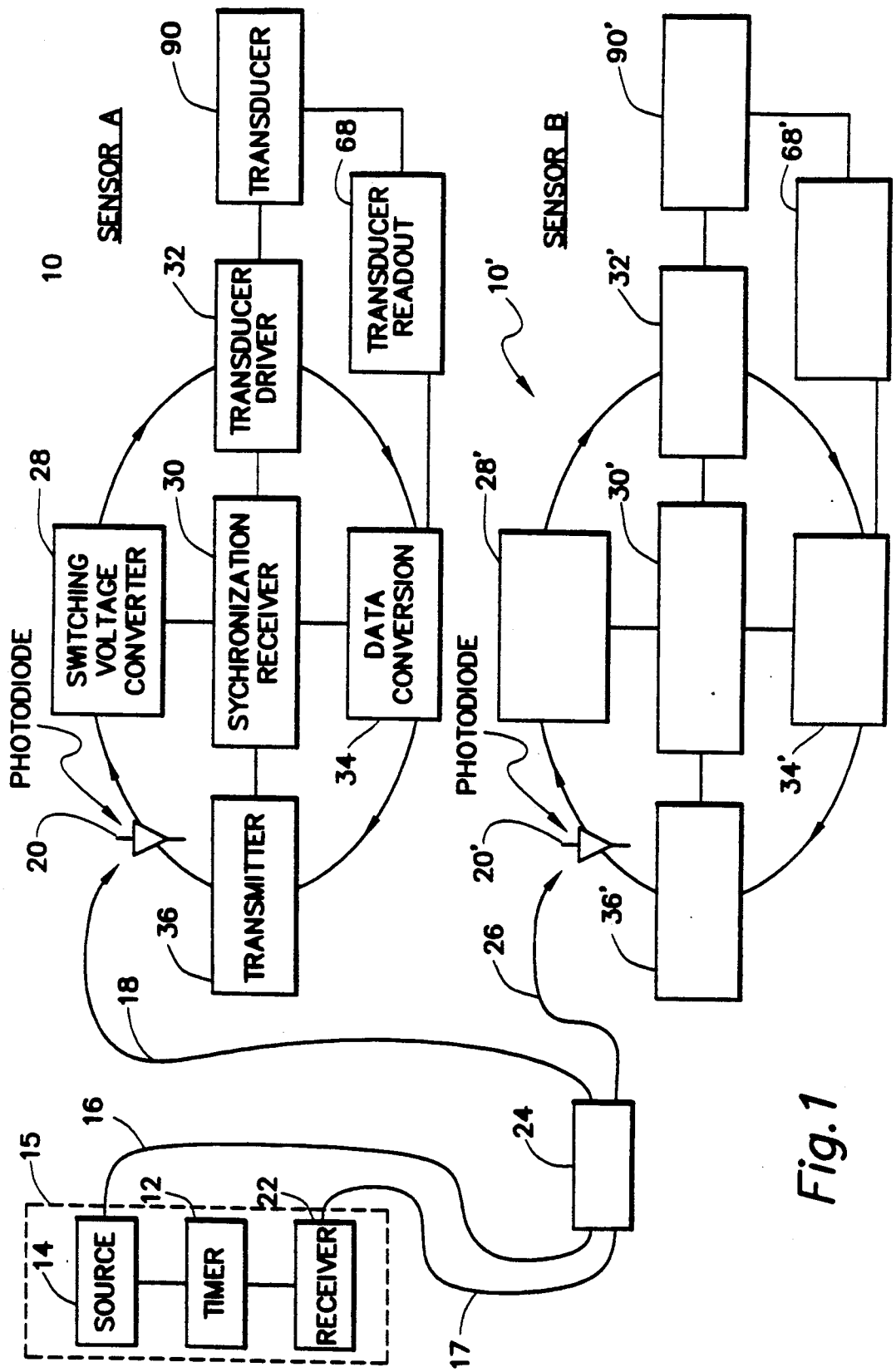
FIG. 1 is a functional block diagram of the present invention.

FIG. 1 is a block diagram showing the basic components of optically powered sensor apparatus 10. Timer 12 has the necessary clock generating electronics and a clock based triggering means goes to source 14 which sends out optical power pulses through optic fiber 16 and optic fiber 18 to photodiode 20. Receiver 22 receives information on optic fiber 18 and optic fiber 17 from optically powered sensor apparatus 10. Optical coupler 24 connects an additional sensor apparatus 10' (sensor B) with optic fiber 26 optical coupler 24 is a 2 by 2 multimode fiber optic coupler. Timer 12, source 14 and receiver 22 are included in an interface controller 15 located between fiber optic coupler 24 and other control devices not necessary to the present invention.

Photodiode 20 converts the optical power pulse to electrical power thereby providing all the power requirements for switching voltage converter 28, synchronization receiver 30, transducer driver 32, data converter 34, and transmitter 36.

FIG. 1 shows the use of a 2×2 optical coupler 24, to multiplex two sensors 10 and 10' to one interface 15. Alternatively, if multiplexing is not required, two separate fibers could be used for one sensor/interface pair. One fiber would connect the source 14 and the photodiode 20 and another fiber would connect the receiver 17 to a light emitting diode (LED) connected to and driven by the transmitter 36.

The open circuit voltage available from photodiode 20 is approximately 0.6 volts at room temperature. Switching voltage converter 28 uses inductive switching to increase this voltage to a level useful for CMOS electronics. The present invention provides for both on-off switching of the instantaneous current through inductor L1 and voltage regulation of photodiode 20 for best power transfer with the circuit illustrated in FIG. 2. The 10 mh inductor 40 and the 2.7 k resistor 42 in series with photodiode 20 contribute negligible power efficiency loss to voltage converter input $V_{ci}$. Transistor Q1 operates as a switch that alternately closes allowing a current due to voltage converter input $V_{ci}$ to flow through inductor L1 to ground and opens interrupting the flow of current through inductor L1 to ground. Q1 interrupts the flow of instantaneous current when there is insufficient current at the base of Q1 to keep Q1 turned on. This condition occurs as $V_{ci}$ is pulled down by the increasing current ramp through inductor L1 to ground, resulting in insufficient current at the base of Q1. When Q1 interrupts the flow of current through inductor L1, the current is forced through diode 38 and onto capacitor 40. As capacitor 40 receives charge due to the diverted inductor current, Voltage Vcc increases. As the rate of current flow into capacitor 40 decreases to zero, $V_{ci}$ again begins to rise. When $V_{ci}$ reaches a certain level, the flow of current into Q1 becomes great enough to turn Q1 on and the cycle repeats.

Figures 2, 4:
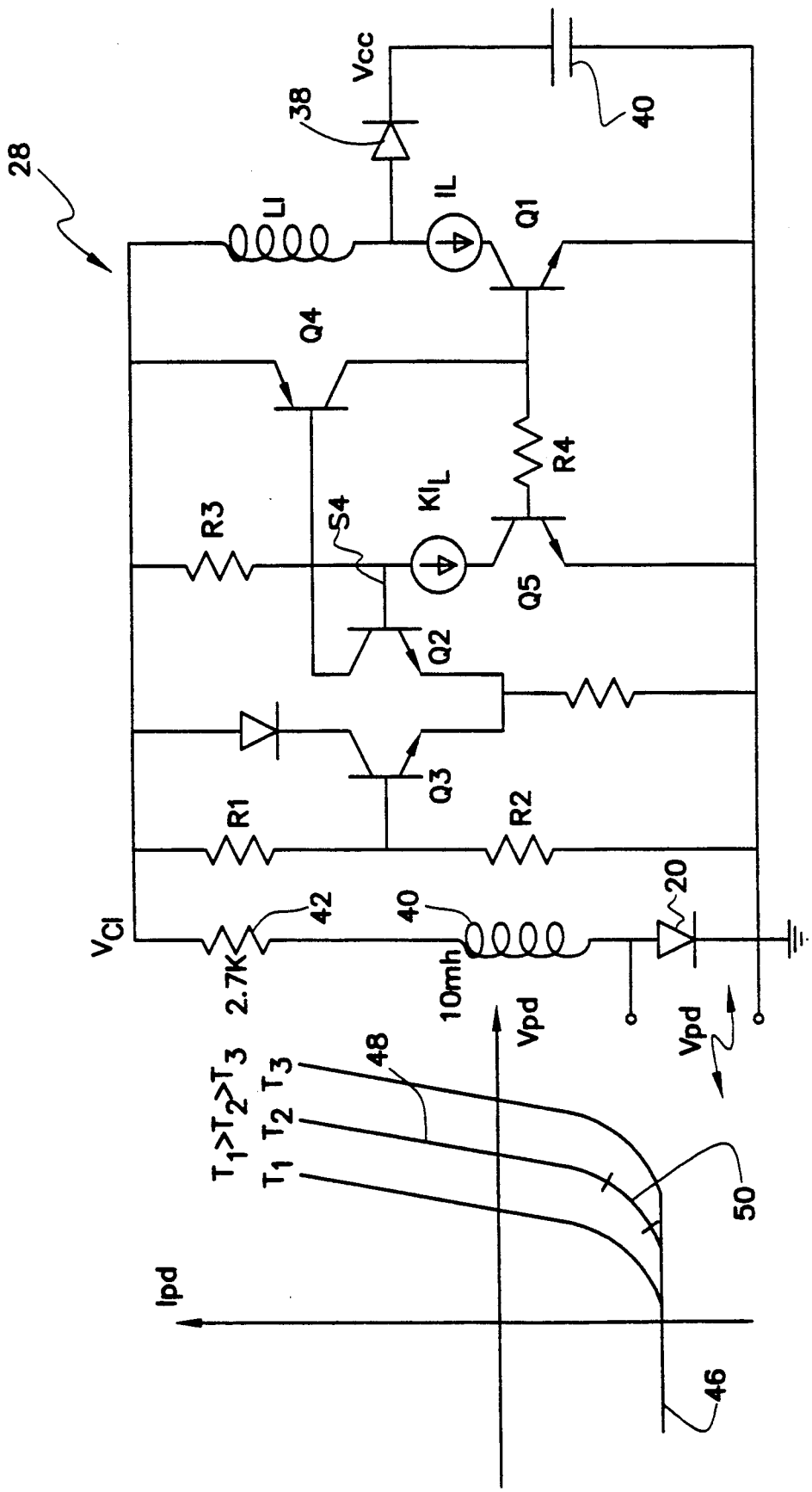
FIG. 2 is a schematic of the switching voltage converter.
FIG. 4 is an illustration of the voltage current characteristic of a photodiode.

In FIG. 2 matched transistors Q2 and Q3 form a simple form of an operational amplifier that will operate on very low power supply voltage, i.e., approximately 0.6 volts. R1 and R2 form a bias arrangement for Q3. Q2 is biased by the combination of R3 and Q5. Q5 is selected and biased by R4 so that current $kI_1$ is a very small proportion of $I_1$. Increases or decreases in $kI_1$ will then indicate increases or decreases in $I_1$.

Figure 3:
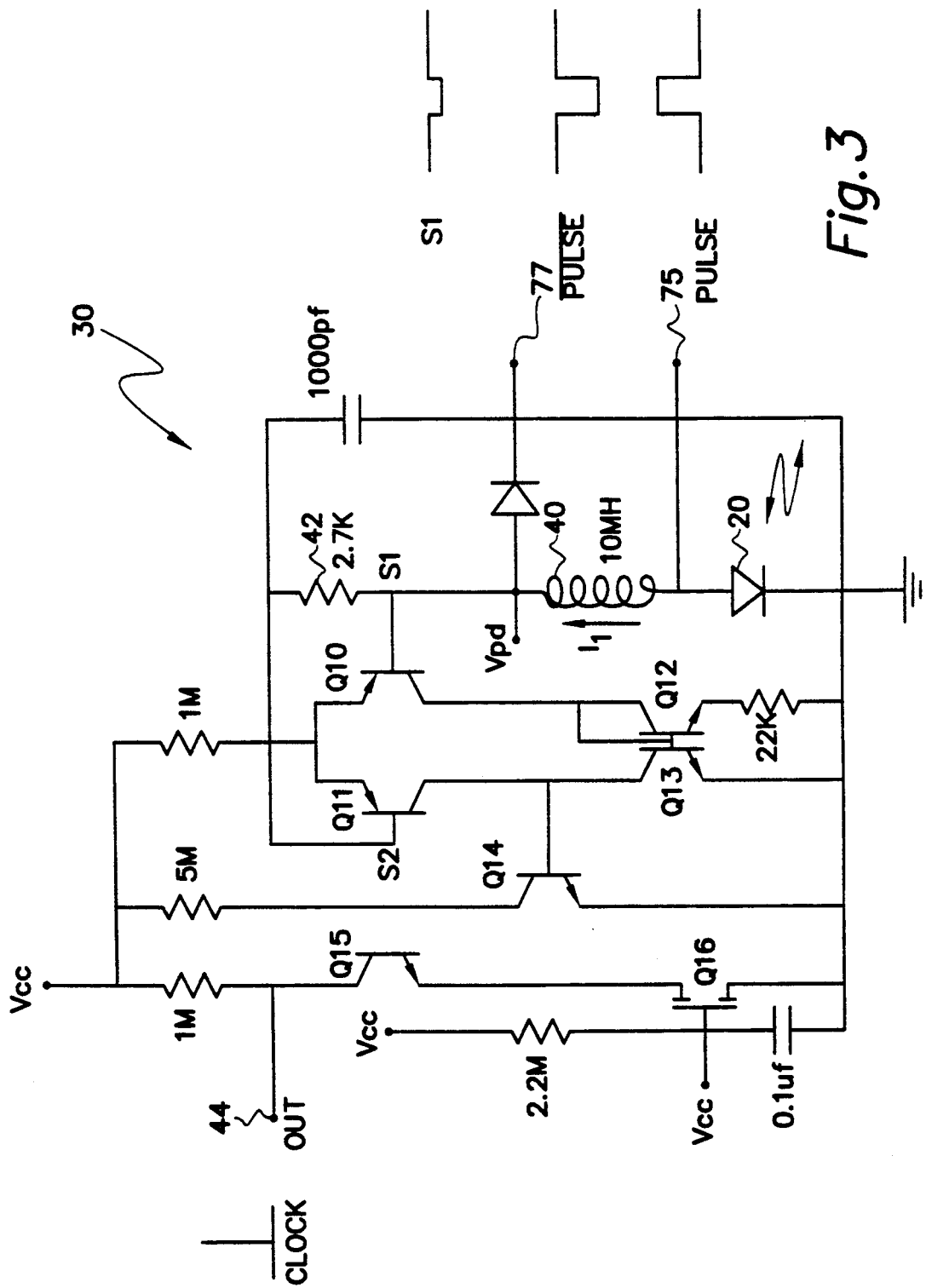
FIG. 3 is a schematic illustration of the synchronizing receiver.

FIG. 3 illustrates the operation of synchronization receiver 30. Optical power pulses are received by photodiode 20 which is a gallium arsenide photodiode. When optical power is being received by photodiode 20 synchronization receiver 30 current flow is in direction $I_1$ through inductor 40 so that point S2 is slightly negative with respect to point S1 due to voltage drop across resistor 42. Transistor Q10 and Q11 are matched transistors. When optical power is interrupted by timer 12 turning off source 14, the current flow through inductor 40 decreases and then reverses in direction. When current flow reverses, point S2 then becomes high with respect to point S1 and transistor Q11 is turned on. This causes transistor Q10 to turn off, and the current mirror comprised of Q12 and Q13 provides a signal to transistor Q14. The 22K resistor 41 provides an offset bias current to ensure that Q14 is normally turned off within a certain noise margin. When the signal is applied to the base of Q14, the common emitter stages comprised of Q14 and Q15 and associated resistors amplify the signal producing a clock pulse at 44.

Transistor Q16 is provided to ensure that no clock pulses are generated as the sensor is being turned on, until the circuit voltage Vcc reaches the threshold voltage of Q16, typically about 1.5 volts.

The voltage-current characteristic of a typical photodiode such as photodiode 20 is illustrated in FIG. 4. The characteristic includes an approximately horizontal portion 46, an approximately vertical portion 48, and a curved connecting or knee portion 50. The most power will be obtained from photodiode 20 when both the voltage and current are at the highest value obtainable on the characteristic curve. Practically this requires operating the photodiode near the knee 50 of the characteristic curve and the circuit shown in FIG. 2 provides this operation as follows. When $V_{pd}$ is too high the symptom will be that $I_{pd}$ and also $I_1$ is too low. When this symptom occurs $kI_1$ will decrease and this decrease will cause S4 to become more positive, Q2 and therefore Q4 to turn on more, and Q1 to turn on more and thus increase $I_1$. When $V_{pd}$ is too low the symptom will be that $I_{pd}$ is too high and therefore $I_1$ is too high. When this symptom occurs, $kI_1$ will have increased causing S4 to become more negative, Q4 to turn off some, and Q1 to turn off some which decreases $I_1$.

The circuit of FIG. 2 also responds to temperature variations in photodiode 20 and provides current stabilization action. For example with photodiode characteristic curves at different temperatures (T1, T2 and T3) as shown in FIG. 4 and with T1>T2>T3 the stabilizing action may be explained. Assume that photodiode 20 had been operating on T2, but due to a change in temperature it should now operate on curve T1.

This means the optimum $V_{pd}$ should be lower than when operating on curve T2. This is effected by relating the base-emitter temperature coefficient of Q5 to the temperature coefficient of $V_{pd}$. The defining relationship is $$\frac{dV_{pd}}{dT} \propto \frac{R2}{R1 + R2} \frac{dV_{be}}{dT} (Q1)$$

Thus the values of R1 and R2 may be selected to cause the desired control action.

Figures 5, 5A:
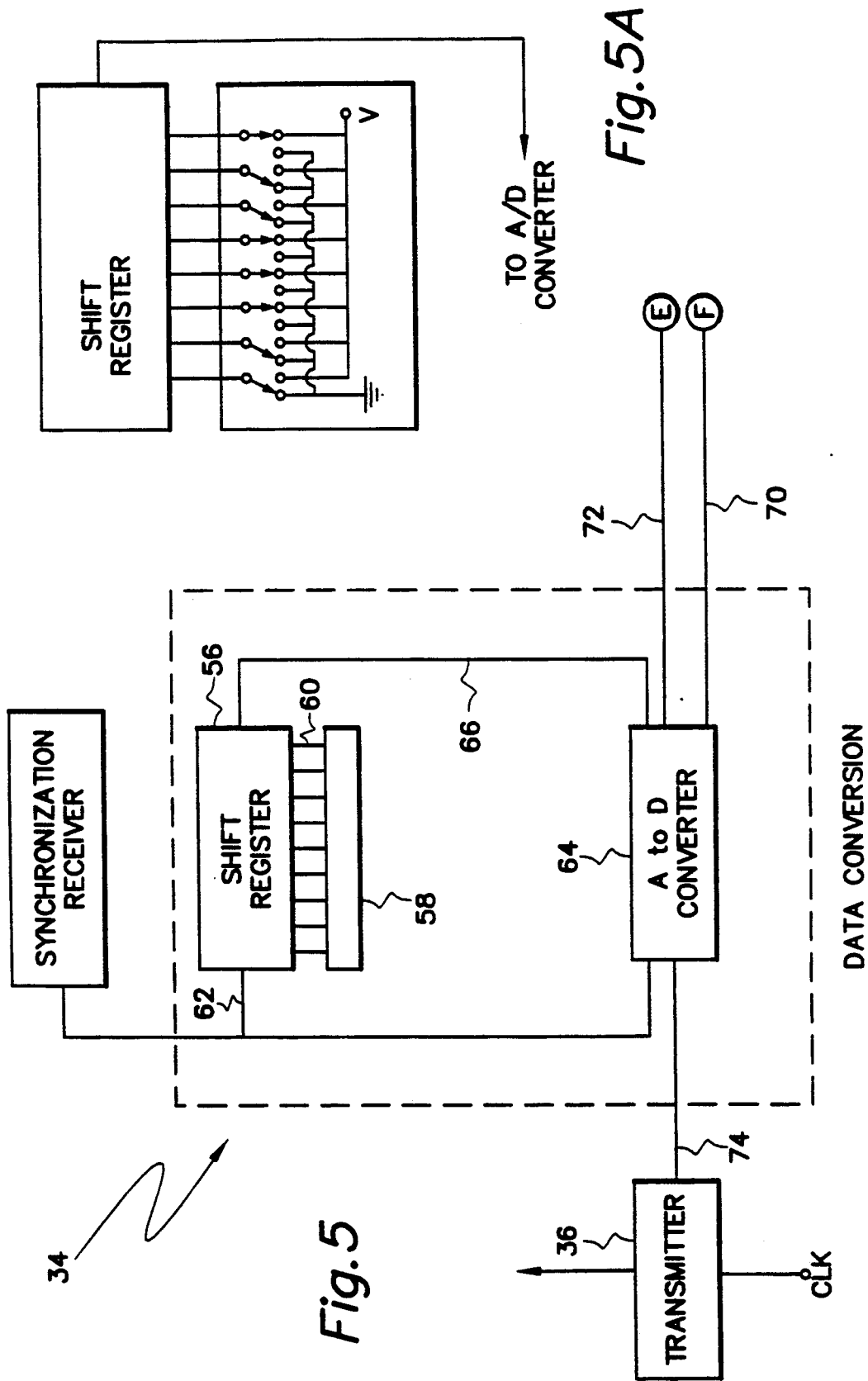
FIG. 5 is a block diagram illustration of the data conversion.
FIG. 5a is an illustration of an alternative embodiment of the present invention.

In FIG. 5 data conversion 34 is illustrated. Shift register 56 has control word 58 hard wired parallel input 60 and a clock input 62. Analog to digital converter 64 has as its serial input 66 the output of shift register 56. Transducer readout 68 provides a reference input 70 and a signal input 72 to analog to digital converter 64. Analog to digital converter 64 also has digital output 74. A/D converter 64 is a ratiometric converter. It takes the ratio of the signal voltage to the reference voltage and this ratio is digital output 74.

Certain types of A to D converters allow the serial input line 66 and the data output line 74 to be connected. In this case, extra monitoring and status information can be sent by the transmitter 36 to the receiver 22. This will allow the monitoring of sensor operation for built-in-test purposes. Alternatively, binary switch information may be used in this way in place of an analog transducer and A/D converter to communicate switch information as is illustrated in FIG. 5a. In this embodiment transducer driver 32 and transducer readout 68 are not required.

Transmitter 36 includes inverters and a power transistor. The transmitter uses an edge detector to construct a series of very short (approximately 300 nanosecond) pulses from the clock signal. These pulses are logically NANDed together with the digital output 74 of A/D converter 64. The transmitter couples this resultant signal to a power transistor so that at each logical "1" the power transistor applies power and injects current into photodiode 20 as shown by pulse at 75 in FIG. 3. Inductor 40 is to keep voltage spikes from S1 when the pulse is applied at 75. An inverse pulse is simultaneously applied at 77 to keep S1 from going positive. If S1 were to go positive then an extra unwanted output clock pulse would occur at 44.

Figure 6:
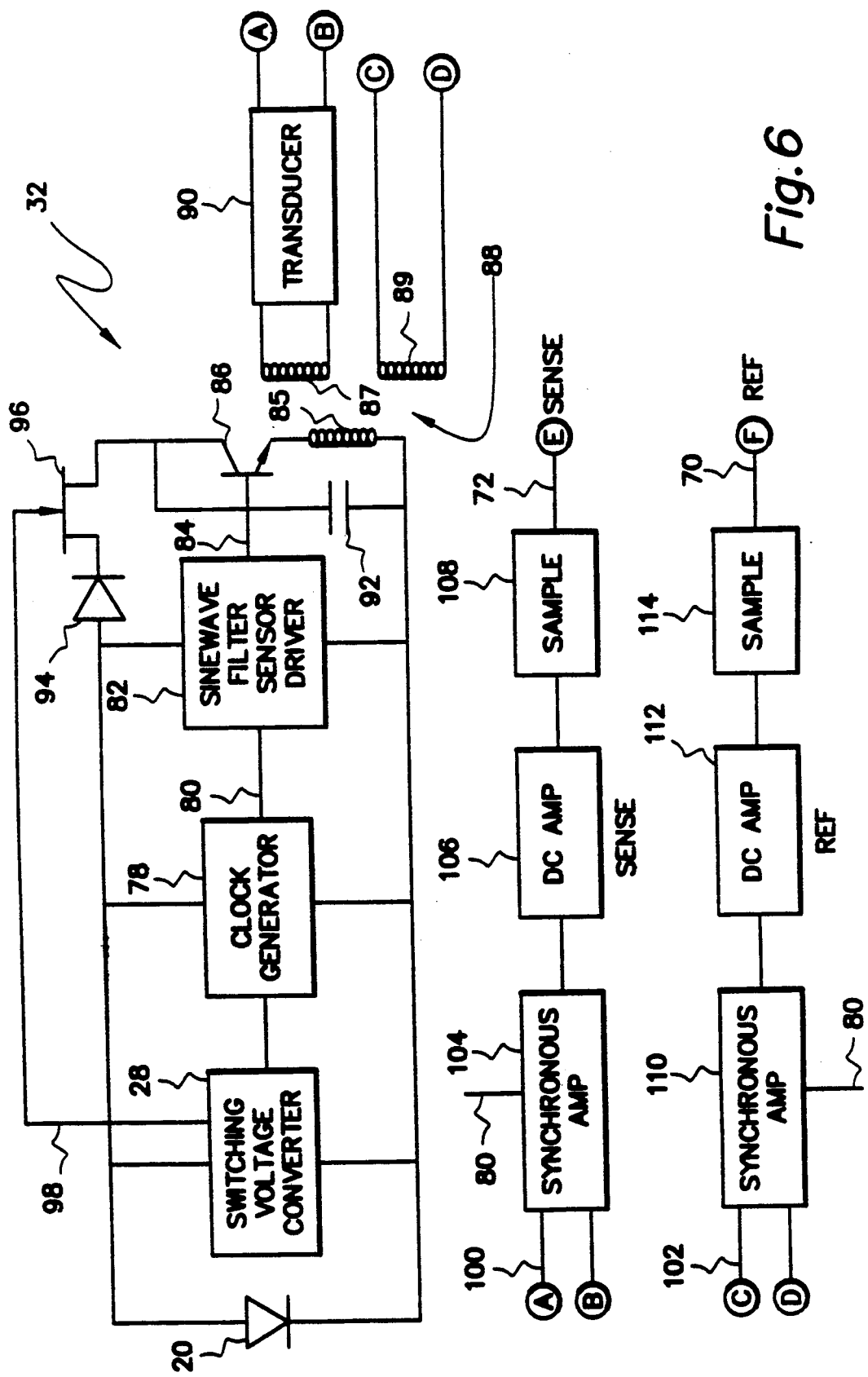
FIG. 6 is a block diagram illustration of the transducer driver and transducer readout functions.

Transducer driver 32 is illustrated in FIG. 6 and is particularly suited to driving an linear variable differential transformer (LVDT) or rotary variable differential transformer (RVDT) type transducer. These transducers require a pure sine wave input for correct operation. In many applications, the relatively low impedance of the LVDT or RVDT would indicate relatively high current. In the present invention, $V_{pd}$ is very low, e.g., 0.6 volts. $V_{cc}$ for the present invention is considerably higher, e.g., 2.5 volts. Clock generator 78 provides a square wave at 80. The frequency of the square wave is chosen to minimize the transducer temperature coefficient. In one successful model this frequency was approximately 3 KHz. Low pass filter 82 converts the square wave to a sine wave at 84 which is applied to the base of NPN transistor 86. Transistor 86 drives transformer 88 which provides power to transducer 90. The present invention permits operation of the transducer with very low power input. Due to impedance mismatch, the low impedance of the LVDT or RVDT would not permit efficient power transfer if the transducer were driven directly with a 2.5 volt source. Therefore $V_{pd}$ is used to drive transformer 88. Transformer 88 is a 1:1:1 transformer with primary coil 85 and secondary coils 87 and 89. The low output impedance of photodiode 20 is well matched to the low impedance transducer 90 and efficient power transfer results. Capacitor 92 provides energy storage and is charged by the photodiode current. Diode 94 insures that the flow of current is only in a direction from photodiode 20 to capacitor 92.

Transistor 96 acts as a switch which is closed in normal operation allowing current from photodiode 20 to pass. However during startup, transistor 90 is open so that available photodiode current may be used to bring up the voltage of switching voltage converter 28 to its normal operating level. Transistor 96 is turned on by line 98 when switching voltage converter 28 is at its normal operating voltage level.

Transformer 88 drives transducer 90 from secondary coil 87. The purpose of transformer 90 is to drive transducer 90 in a sensing channel 100 and also provide a floating facsimile of the driving signal in a reference channel 102. Sensing channel 100 includes synchronous amplifier 104, DC amplifier and low pass filter (LPF) 106, and sampler 108. Reference channel 102 includes synchronous amplifier 110, DC amplifier and low pass filter (LPF) 112 and sampler 114. In the present invention, sensor apparatus 10 contains a transducer signal in sensing channel 100 and a reference signal in reference channel 102. Both the sensing signal and the reference signal are full wave rectified in order to use all of the signal information rather than only half. Sensing channel output 72 and reference channel output 70 are inputs to analog to digital converter 64.

Figure 7:
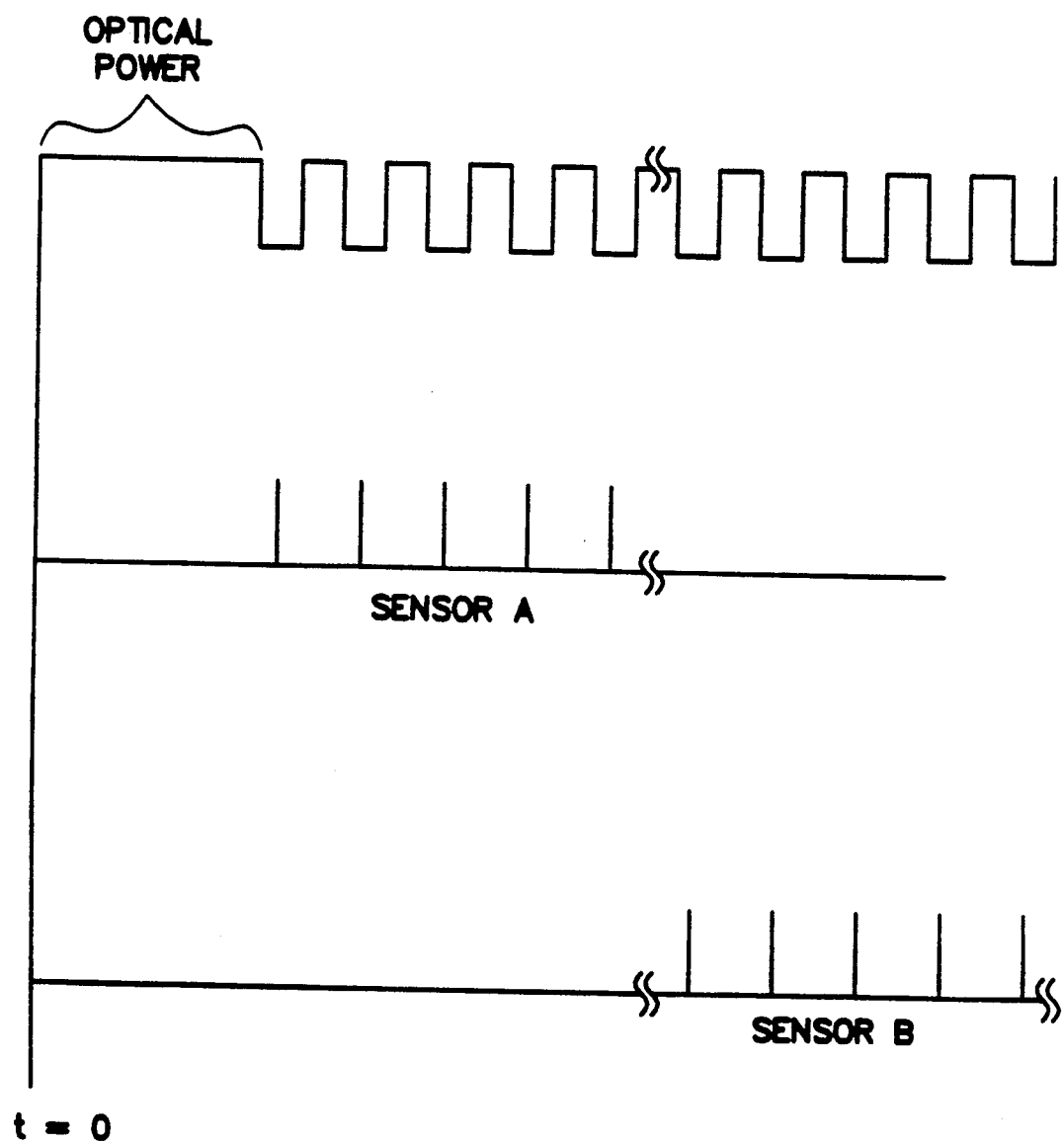
FIG. 7 is an illustration of the communication protocol of the present invention.

Optically powered sensor apparatus 10 utilizes a protocol as shown in FIG. 7 which allows multiple sensors to receive optical power and provide parameter information to a controller over a single optical fiber from a coupler 24. Optical power source 14 is intermittently modulated to provide a synchronizing pulse train. Sensor A and sensor B are logically coded to respond with binary data on the sensed parameter during a unique preset subset of the pulse train sequence. Individual data bits may also be defined to provide power, operational status or data parity.

Now that the construction and operation of optically powered sensor apparatus 10 has been described, certain advantages can be set forth and appreciated. Sensor apparatus 10 operates at extremely low power levels. Switching voltage converter 28 stabilizes the operating voltage of photodiode 20 at its most efficient operating point in order to provide high optical to electrical efficiency over a wide range of operating temperatures. Switching voltage converter 28 has a self-starting capability down to approximately 0.4 volts available from photodiode 20.

Synchronization receiver 30 identifies periods in which optical power has dropped to zero and transmitter 36 forward biases photodiode 20 to emit a pulse of light signifying a data bit. This arrangement provides a data transmission function having high bandwidth and operating with low power on a single fiber.

Transducer driver 32 uses extremely low power to provide a relatively pure sine wave to LVDT or RVDT type transducer 90. The impedance of transducer 90 is well matched to photodiode 20 for best power transfer efficiency.

In accordance with the foregoing description, Applicant has developed an optically powered sensor apparatus that may be incorporated into the design of optically powered sensing systems. Although a specific embodiment of Applicant's invention is shown and described for illustrative purposes, a number of variations and modifications will be apparent to those of ordinary skill in the relevant arts. It is not intended that coverage be limited to the disclosed embodiment, but only by the terms of the following claims.

The embodiments of an invention in which an exclusive property or right is claimed are defined as follows:

1. Optically powered sensor apparatus for use with a controller that provides timed optical power and receives optical signal pulses;
   light conducting means for conveying the optical power from said controller and the optical signal pulses to said controller;
   conversion means for receiving the power from said controller and converting the power into electrical energy;
   synchronizing means connected to said conversion means for detecting power interruptions and providing synchronizing signals;
   sensor means for sensing desired parameters and for electrically converting said parameters into electrical parameter signals;
   transmitter means connected to said sensor means and to said synchronizing means for receiving electrical parameter signals from said sensor means and for applying the signals to said conversion means during the power interruptions for converting the signals into return light signals and for providing the return light signals to said light conducting means.

2. Apparatus of claim 1 wherein said conversion means comprises;
   a photodiode having a voltage current characteristic response having a lower approximately horizontal portion, an upper approximately vertical portion and a curved knee portion joining the upper and lower portions;
   an inductor connected to said photodiode;
   an energy storage device;
   means for alternately conducting a current through said inductor, interrupting said current and diverting said current to said energy storage device;
   means for controlling the average value of said current to maintain the average value at the curved knee portion of the voltage current characteristic to optimize power transfer.

3. Apparatus of claim 2 wherein said conversion means further comprises:
   temperature compensation means for maintaining the average value of said current at the curved knee portion of the voltage current characteristic as the temperature of said conversion means varies over a range of temperatures.

4. The apparatus of claim 3 wherein said range of temperature extends from $-55°$ C. to $+125°$ C.

5. The apparatus of claim 4 wherein said sensor means comprises:
   a differential transformer type transducer for determining position;

transducer driver means for providing a sine wave to said transducer and matching said photodiode impedance to said transducer impedance;

transducer readout means having an analog output representative of the position; and data conversion means for converting the analog output of said transducer readout means to a series of pulses for driving said transmitter means.

6. The apparatus of claim 5 wherein said differential transformer type transducer is a linear variable differential transformer or a rotary variable differential transformer.

7. The apparatus of claim 6 wherein said transducer driver means comprises:

a clock generator for providing a square wave signal:

a lowpass filter for converting the square wave to a sine wave;

transformer means for driving said transducer;

transistor means controlled by said square wave signal and powered by said photodiode for driving said transformer.

8. The apparatus of claim 1 wherein said conversion means, said synchronizing means, said sensor means and said transmitter means comprise a sensing end module; wherein said light conducting means includes coupling means for coupling multiple sensing modules to said controller; and wherein each sensing module is logically coded to respond to a unique preset pulse train from said controller.

9. The apparatus of claim 7 wherein said first conversion means, said synchronizing means, said sensor means and said transmitter means comprise a sensing end module; wherein said light conducting means includes coupling means for coupling multiple sensing modules to said controller; and wherein each sensing module is logically coded to respond to a unique preset pulse train from said controller.

10. Apparatus of claim 3 wherein said sensor means comprises a binary switch having an output which is applied to said transmitter means.

11. In an optically powered sensor apparatus having timing means for producing timing signals, source means connected to said timing means for selectively providing power in the form of light, light conducting means for both conducting light to a sensing location and for conducting return light signals containing sensed parameter information from the sensing location, and receiving means connected to said timing means and to said light conducting means for receiving the return light signals from said light conducting means, the sensing location improvement which comprises:

conversion means for receiving the power from said source means and converting the power into electrical energy;

synchronizing means connected to said conversion means for detecting an interruption in power;

sensor means for sensing desired parameters and for electrically converting said parameters into electrical parameter signals;

transmitter means connected to said sensor means and to said synchronizing means for receiving electrical parameter signals from said sensor means and for applying the signals to said conversion means during the power interruptions for converting the signals into return light signals and for providing the return light signals to said light conducting means for transmission to said receiving means.

12. Apparatus of claim 11 wherein said conversion means comprises;

a photodiode having a voltage current characteristic response having a lower approximately horizontal portion, an upper approximately vertical portion and a curved knee portion joining the upper and lower portions;

an inductor connected to said photodiode;

an energy storage device;

means for alternately conducting a current through said inductor, interrupting said current and diverting said current to said energy storage device;

means for controlling the average value of said current to maintain the average value at the curved knee portion of the voltage current characteristic to optimize power transfer.

13. Apparatus of claim 12 wherein said conversion means further comprises:

temperature compensation means for maintaining the average value of said current at the curved knee portion of the voltage current characteristic as the temperature of said conversion means varies from over a range of temperatures.

14. The apparatus of claim 12 wherein said range of temperatures extends from $-55°$ C. to $+125°$ C.

15. The apparatus of claim 13 wherein said sensor means comprises:

a differential transformer type transducer for determining position;

transducer driver means for providing a sine wave to said transducer and matching said photodiode impedance to said transducer impedance;

transducer readout means having an analog output representative of the position; and data conversion means for converting the analog output of said transducer readout means to a series of pulses for driving said transmitter means.

16. The apparatus of claim 11 wherein said conversion means, said synchronizing means, said sensor means and said transmitter means comprise a sensing end module; wherein said light conducting means includes coupling means for coupling multiple sensing modules to said source means and to said receiving means; and wherein each sensing module is logically coded to respond to a unique preset pulse train from said source means.

17. The apparatus of claim 16 wherein said conversion means, said synchronizing means, said sensor means and said transmitter means comprise a sensing end module; wherein said light conducting means includes coupling means for coupling multiple sensing modules to said source means and to said receiving means; and wherein each sensing module is logically coded to respond during a unique preset pulse train from said source means.

18. The apparatus of claim 13 wherein said sensor means comprises a binary switch having an output which is applied to said transmitter means.

* * * * *